United States Patent [19]

Muenchhausen et al.

[11] 3,713,098

[45] Jan. 23, 1973

[54] METHOD AND APPARATUS FOR DETERMINING AND STORING THE CONTOUR COURSE OF A WRITTEN SYMBOL SCANNED COLUMN BY COLUMN

[75] Inventors: Meinolf Muenchhausen; Ekke Weber, both of Gauting, Germany

[73] Assignee: Siemens Aktiengesellschaft, Berlin and Munich, Germany

[22] Filed: March 25, 1971

[21] Appl. No.: 127,925

[30] Foreign Application Priority Data

April 10, 1970 Germany....................P 20 17 246.7

[52] U.S. Cl.....................340/146.3 AC, 340/146.3 Y

[51] Int. Cl...............................................G06k 9/00

[58] Field of Search......340/146.3 AC, 146.3 AE, 146.3 Y, 340/146.3 SG, 146.3 J, 146.3 R, 146.3 H

[56] References Cited

UNITED STATES PATENTS

| | | | |
|---|---|---|---|
| 3,347,981 | 10/1967 | Kagan et al. | 340/146.3 Y |
| 3,430,198 | 2/1969 | Gattner et al. | 340/146.3 AC |
| 3,346,845 | 10/1967 | Fomenko | 340/146.3 AC |

*Primary Examiner*—Thomas A. Robinson
*Attorney*—Hill, Sherman, Meroni, Gross & Simpson

[57] ABSTRACT

A method and apparatus for the determination and intermediate storage of a written symbol which consists of several contours and which is scanned column-wise, and which utilizes the scanning results of two adjacent scanning columns. In each scanning column, a contour is determined at a change of the digitalized image signal from one phase to another and the phase changes are counted consecutively so that each contour is assigned a certain address in a contour memory. Apparatus is employed to determine the difference values of the ordinates of a contour occurring in the adjacent scanned columns quantitatively and these difference values are stored in the contour memory. The start of a pair of new contours is determined by apparatus which is responsive to an image signal change only when the ordinates of two consecutive columns meet the unbalanced equation $$Yn(k) \leq Ym(k-1) + C$$

and the end of two contours is determined by the image signal change only when the ordinates of two consecutive columns meets the unbalanced equation $Yn(k) \leq Ym(k+1) + C$, where $Yn$ and $Ym$ are ordinate values, $k$, $(k+1)$ and $(k-1)$ identify scanned adjacent columns, and $C$ is a functional variable.

7 Claims, 8 Drawing Figures

INVENTORS
Meinolf Muenchhausen
Ekke Weber

BY Hill, Sherman, Meroni, Gross & Simpson ATTYS.

INVENTORS
Meinolf Muenchhausen
Ekke Weber

BY Hill, Sherman, Meroni, Gross & Simpson ATTYS.

METHOD AND APPARATUS FOR DETERMINING AND STORING THE CONTOUR COURSE OF A WRITTEN SYMBOL SCANNED COLUMN BY COLUMN

BACKGROUND OF THE INVENTION

1. Field of the Invention

This invention relates to a method and apparatus for the determination and intermediate storage of a written symbol, which symbol consists of several contours which are scanned column by column, wherein the scanning results of two adjacent scanning columns are utilized to determine and store digital information which represents the symbol.

2. Description of the Prior Art

In the field of symbol scanning and reproduction, the total problem of symbol identification is subdivided into two subproblems. One of these subproblems is in maintaining the scanning result in a corresponding form during the scanning process of the written symbol to be identified. The other subproblem resides in assigning the scanning result in a classification process to a certain category of significance. It has been long recognized in the art that the essential information content of a written symbol resides in its contours; here, contours shall mean the geometric location of identical changes of the information parameters of the symbol. Consequently, numerous experiments have been conducted to scan a written symbol ón the basis of its contour course, that is to influence the scanning process itself by the contour of the symbol. One method of scanning which satisfactorily operates according to this principle has the great advantage that for the actual classification of the scanned written symbol, a scanning result is obtained which practically still possesses the entire information content of the written symbol. This result has a particularly favorable effect on the classification process if alphanumeric written symbols are also to be identified with the method for the identification of symbols. In such a case, a definite class of significance must be assigned to each written symbol from a major number of classes of significance. If the method for identifying symbols is to be generally applicable, even within one class of significance, a multiplicity of symbol variations must be admitted or assumed, which variations may also be partially attributed to disturbances or gaps in the written symbols.

However, the foregoing advantages are offset by disadvantages of great consequence which result from the above outlined scanning principle. Since, in an optical system, the scanning beam of light must be deflected in accordance with the contour course of the symbol to be scanned, at first this contour course is unknown and the control for deflecting the luminous beam of a cathode ray tube, for example, is rendered extremely difficult and costly, particularly in case of interruptions of the lines of the symbol. For an unknown symbol structure, one can only start out on the basis that a luminous ray following a contour shall continue to be deflected in its current direction until an interruption is encountered because of a certain probability that the contour will maintain its direction with respect to the beam.

The foregoing clearly illustrates the difficulties of this scanning principle. On the one hand, the scanning speed is limited because of the necessary search operations of the scanning system in the case of disturbed symbols, and in the case of symbols whose course of contour does not consist of continuous contours; on the other hand, the scanning result is not of sufficient precision in all cases so that the information obtained therefrom is not sufficient to reproduce the original contour. Moreover, this situation may be attributed to the fact that considerable difficulties are encountered in determining the coordinates of the contours with geometric precision.

Because of the foregoing difficulties and because of the expense encountered in a practical embodiment of such a scanning procedure, another method has been utilized in scanning the written symbol on a columnwise basis. In this respect, the scanning results of two scanning columns, adjacent one another, are compared with each other and so called form elements are determined, which elements are supposed to be characteristical for written symbols of a certain class of significance. However, this means that during the scanning process itself a substantial reduction of the data content of the written symbol to be identified is already carried out and the original contour of the written symbol will no longer be restorable from the scanning result. This in turn results in making it necessary for one to identify the written symbol with considerably fewer data in the actual classification. Therefore, such methods are limited in their possibilities of application in that they are restricted to written symbols with only few variations in one class of significance, and in addition, they are highly prone to disturbances, because in case of major symbol disturbances, a high rate of rejection and/or a high rate of erroneous identification must be anticipated.

SUMMARY OF THE INVENTION

In consequence of the foregoing disadvantages of the prior art, the present invention is based on the problem of creating a method for the determination and intermediate storage of a written symbol, which is composed of a contour course assembled from several individual contours, wherein the symbol can be scanned column by column in order to avoid the cost for controlling the scanning system in search operations, and to eliminate the time required for such search operations. Furthermore, the contour course is to be obtained exclusively from the digitalized scanning result of two adjacent scanning volumns, so that the entire contour of a symbol can be stored reversibly in a relative simple low capacity memory as an intermediate storage apparatus.

According to the invention, the foregoing problem is solved by a method and apparatus wherein for each scanning column a contour is determined at a change of the digitalized image signal from one phase to another. Each of these phase changes is counted consecutively so that each contour is assigned a certain address of a contour memory. The difference values of the ordinates of a contour occurring in two consecutive scanning columns are determined quantitatively and stored in the contour memory. The start of a pair of new contours is determined by an image signal change only when for the ordinates of two consecutive scanning columns n, m a first unbalanced equation $$Yn(k) \leqslant Ym(k-1)+C$$

is met and the end of a pair of contours is determined by the image signal change only when another unbalanced equation $$Vn(k) > Ym(k+1)+C$$

is met.

The advantages of column-by-column scanning can therefore be combined, as a result of the solution according to the present invention, in a simple manner with the advantages resulting from a reversible intermediate storage of the contour course of a scanned symbol. Under the column-by-column scanning principle, the control for the deflection of the luminous beam which scans the written symbol becomes particularly simple, and the exact assignment of the geometric coordinates of the image dot just scanned becomes possible in relation to the entire scanning field. Moreover, with this type of scanning, and the subsequent intermediate storage of the scanning result, very little information is lost so that with regard to the digitalized image signal, this process can be designated as reversible. This signifies a facility for later classification in which, even at stricter requirements to be met by the symbol identification system, it is essential that the entire scanning result is available. Therefore, as already proposed, it becomes possible, for example, to execute the actual classification process in several steps and thereby reduce the rejection rate.

The above-mentioned preprocessing of the image signals obtained during scanning makes possible a particularly advantageous improvement wherein a contour storage is directly addressable in a memory because, with the address $k$ of a contour, the $k^{th}$ line of the contour memory is selected. With a determined beginning of two new contours with the addresses $(k-1)$ and $k$, all lines of the contour memory whose addresses are greater than $(k-2)$ are transferred into respective lines having addresses greater by two, and with a determined end of a pair of contours, the contents of all memory lines whose addresses are higher than the addresses of the terminated contour pair are restored into memory lines having addresses smaller by two as soon as the values of the terminated contour pair have been transferred to an additional smaller contour memory. This procedure accomplishes the feature that at any moment the number of lines occupied in the contour memory is equal to the number of contours in the column scanned. In addition to the low memory space requirement for contour storage, this technique provides a particularly simple selection of memory locations.

BRIEF DESCRIPTION OF THE DRAWINGS

Other objects, features and advantages of the invention, its organization, construction and operation will be best understood from the following detailed description thereof taken in conjunction with the accompanying drawings, in which.

DESCRIPTION OF THE PREFERRED EMBODIMENT

Under the principles of column-wise scanning of a symbol located in a scanning field, for example with the aid of a deflected electron beam, the luminous beam impinges upon several contours one by one. The contours of a digital writing symbol shall here mean the edges of the lines produced by the black-white transfers or by the white-black transfers encountered during scanning. These contours are identified in FIG. 1 by an ordinal number $k$; therefore, in the symbol 2 represented in FIG. 1, six contours are present whose starts and finishes are identified by circles. In the central portion Z of the symbol 2 and covering seven scanning columns $x = 5$ through $x = 11$ in this particular case, each contour k can be described clearly by the difference values $[Yn(k) - Ym(k)]$ of the contour ordinates occurring from column $m$ to column $n$ as shown in Table I below. The value $Vn(k)$ is the ordinate value of one of the contours $k$ in the $n$-th sensing column and the value $Vm(k)$ is the ordinate value of the same contour in the preceding m-th column.

TABLE I

| k | Ordinate differences $[Yn(k) - Ym(k)]$ in the range of the central portion Z | | | | | | |
|---|---|---|---|---|---|---|---|
| 6 | 1 | 1 | −1 | 0 | 0 | −2 | 0 |
| 5 | 2 | 0 | 0 | 0 | −1 | 0 | −2 |
| 4 | 0 | 1 | 1 | 1 | 0 | 1 | 2 |
| 3 | 1 | 0 | 1 | 1 | 1 | 0 | 1 |
| 2 | 0 | 0 | 0 | 0 | 0 | 1 | −1 |
| 1 | 0 | 0 | 0 | 0 | 0 | 0 | 0 |
| $x$ | 5 | 6 | 7 | 8 | 9 | 10 | 11 |

A contour description such as that illustrated above is still not appropriate for later classification; rather, it is desired to break down each contour into its individual elementary characteristics. In this connection, it has been found to be highly advantageous and favorable to describe a contour by four elementary characteristics designed as "ascent positive" (SP) for an ascending contour course, "ascent negative" (SN) for a descending contour course, "vertical" (VE) for a vertical course and "horizontal" (HO) for a horizontal contour course. These designations were selected for the purpose of illustration. However, for digital mechanical processing a code must be assigned to these characteristics; such an assignment is shown in Table II below.

TABLE II

| Elementary Characteristics | Code |
|---|---|
| Ascent positive (SP) | 10 |
| Ascent negative (SN) | 01 |
| Vertical (VE) | 11 |
| Horizontal (HO) | 00 |

Figure 1:
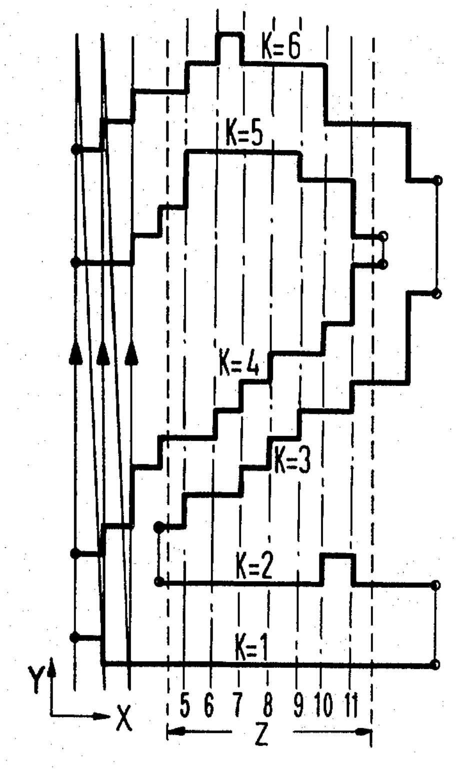
FIG. 1 is a schematic recitation of the symbol 2 having a plurality of contours $k$.

In Table III below, an example is provided for the description of the contour on the basis of the characteristics of the central portion of the sixth contour of the symbol 2 represented in FIG. 1.

TABLE III

| | | | | | | | | |
|---|---|---|---|---|---|---|---|---|
| $Yn - Ym$ | 1 | 1 | -1 | 0 | 0 | -2 | | 0 |
| Characteristic | SP | SP | SN | HO | HO | VE | SN | HO |
| | 10 | 10 | 01 | 00 | 00 | 11 | 01 | 00 |

In Table III, the difference values of the coordinates of the contour $(Yn - Ym)$ are shown again in the first line of the table which was taken from the line $k = 6$ of Table I. In the second line of Table III, the elementary characteristics SP, SN, HO and VE which are formed by these difference values are represented. The penultimate column of Table III shows that several elementary features may and must be formed from a difference value 2, in order to describe the contour at this point with sufficient clarity. This is always the case when in two consecutive scanning columns, a difference value greater than one is present. Therefore, for example, the sequence of elementary characteristics 10, 11, 11, 11, 11 corresponds to a difference value of +5.

In order to be able to form the difference values of the contour coordinates, each image signal change detected must be clearly assignable to a certain contour, that is an address of this contour must be determined. In areas such as in the central portion of the symbol 2 in FIG. 1, a simple marking instruction is possible for each contour by regularly counting the image signal changes in each column. However, this technique no longer has application when the number of contours changes from one contour column to another one, or, rephrased, when in the adjacent scanning contour, a new contour pair is present, as can be seen for example schematically in FIG. 2 in the $n^{th}$ scanning column with a pair of new outer contours.

In order to maintain the assignment of the image signal changes in relation to certain contours, such contour starts and/or contour terminations must be identified. However, the ordinates of the black-white transfers and the white-black transfers of two adjacent columns assigned to the contours are adequate for this purpose. By identifying with $Yn\ (k)$, the $k^{th}$ contour ordinate of the column n just scanned and with $Ym\ (k)$, the $k^{th}$ contour ordinate of the previously scanned adjacent column m and by counting the contour address $k$ in the $Y$ direction from the bottom up, normally the value of a higher addressed contour ordinate is greater than that of a lower addressed adjacent contour ordinate. This rule, however, only forms an exception in contour starts and contour terminations, as also shown from the representation in FIGS. 2 and 3. More generally expressed, this means that in a contour start, the unbalanced equation $$Yn\ (k) \leq Ym\ (k-1) + C \quad (1)$$

and in a contour finish the unbalanced equation $$Yn\ (k) > Ym\ (k+1) + C \quad (2)$$

must be met, or the contour already marked so far will continue in its direction.

Figure 2:
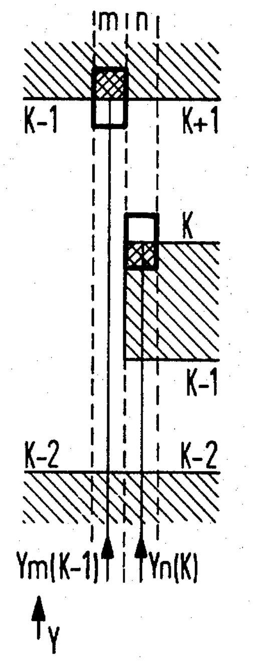
FIG. 2 is a diagram of a symbol structure wherein a new outer contour occurs in the scanning column $n$.
Figure 3:
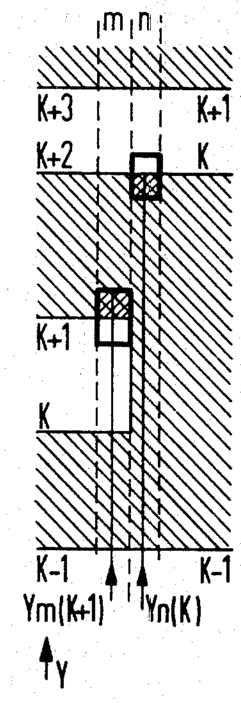
FIG. 3 shows a diagram of a symbol structure where an inner contour ends.

The criterion of differentiation between an outer contour shown in FIG. 2 and an inner contour shown in FIG. 3 is the direction of transfer of the image signal change in the scanning column $n$ just scanned at a moment where the unbalanced equation is met. For the start or the termination of an inner contour, its course is precisely reversed with respect to that of the start or termination of an outer contour, as can be seen by comparing FIG. 4 to FIG. 5 and/or FIG. 6 to FIG. 7. In these figures, the borderline cases of structural configurations are illustrated schematically by which the value of the functional variable C shall be determined individually.

Figure 4:
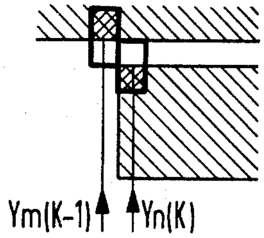
FIGS. 4–7 illustrate schematic borderline cases of symbol structures with the beginning or the end of outer and/or inner contours, on the basis of which various values are determined for a functional variable.

FIG. 4 illustrates in the $n^{th}$ scanning column, the start of a new pair of outer contours where, in each case, the $k^{th}$ contour ordinate is indicated by a black-white transfer of the image signal. The connection between both contour ordinates in the adjacent columns is found in accordance with the equation $$Yn\ (k) = Ym\ (k-1) - 2. \quad (3)$$

The functional variable C is therefore equal to −2 at the start of new outer contours.

Figure 5:
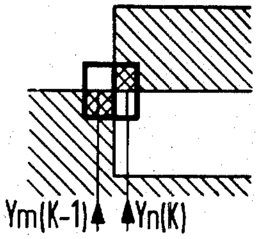

FIG. 5 illustrates the corresponding borderline case for the start of a new pair of inner contours where in the column $n$ of the $k^{th}$ contour a white-black transfer of the image signal is assigned. For both contour ordinates here involved the following expression results.

$$Yn\ (k) = Ym\ (k-1) + 1. \quad (4)$$

In order to meet the unbalanced equation (1), the functional variable C = 1.

Figure 6:
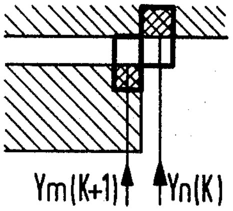

FIG. 6 illustrates the termination of a pair of outer contours where a white-black transfer of the image signal takes place in the $k^{th}$ contour ordinate of the scanning column $n$. This structural configuration can be described by the equation $$Yn\ (k) = Ym\ (k+1) + 2. \quad (5)$$

In the unbalanced equation (2), the functional variable is then found to be C = 1.

Figure 7:
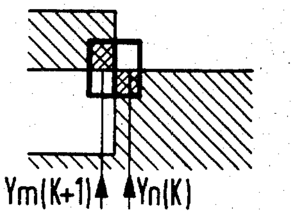

For the final borderline case, FIG. 7 illustrates the fourth possibility, namely the borderline case for the termination of an inner contour pair in a scanning column $n$, whereby a black-white transfer of the image signal occurs in the scanning column $n$ at the $k^{th}$ contour ordinate. The relationship between these contour ordinates to be compared $$Yn\ (k+1) \text{ and } Yn\ (k)$$

is therefore obtained in accordance with the equation $$Yn\ (k) = ym\ (k+1) - 1. \quad (6)$$

In order to meet the unbalanced equation (2), the functional variable C must therefore again assume the value of −2.

The foregoing discussion leads to the general conclusion that the functional variable C assumes in the unbalanced equations (1) and (2) respectively, the value −2 at a black-white transfer in the $n^{th}$ scanning column and/or the value 1 at a white-black transfer. This means that whenever one of the two unbalanced equations is met, it will be possible to determine from the direction of the change of condition of an image signal whether a pair of inner and/or outer contours starts or terminates. To be able to operate in each case with this unbalanced equation system, it suffices to assume or presuppose that at any moment comparative contours exist above and below the current contour. This is readily accomplished for example by simulation of two contours at the upper and lower image edges.

The foregoing discussion clearly shows that a current contour can be described reversibly with the aid of four elementary features obtained from the difference of the contour ordinates of adjacent scanning columns and that the description of this contour is completed by identifying the description of the ordinates of its start and termination.

A contour memory KSP (FIG. 8), in which the contour course of a scanned written symbol can be stored temporarily and addressed directly may be so designed according to the invention but in each case the entire description of a contour is stored in a corresponding memory cell. It is therefore now possible to divide the contour memory schematically and column-wise into three memory units. The first memory unit SKA has two columns for the coordinates of the contour start given by a definite (size) of the $x$ scanning columns as an abscissa value and the Y ordinate. The second memory unit SKE of the contour memory KSP1 is accordingly likewise constructed from two columns which analogously accommodate the coordinates for a contour termination. The third memory unit of the contour memory, the feature memory SM, finally contains in each one of its memory lines all elementary features describing that contour which is assigned to the line. In order to be able to maintain the direct addressing of the contour memory and thus the simple memory location choice, it is necessary to make available with each contour start of a new contour pair two memory lines of the contour memory KSP1 to receive the contour description. If the contour memory already contains the description of current contours whose ordinal number now changes due to the presence of a new contour pair, the memory cells of the contour memory KSP1 whose addresses are higher than $(k-1)$ must be restored in each case by two lines upward. Then the starting coordinates of the new contours Y$n$ $(k)$ and Y$m$ $(K-1)$ can be accommodated in the vacated memory lines. The same also applies conversely to the termination of a contour. First the feature sets of the concluded contour are transferred into an additional memory; at the same time, a feature reduction is performed. This second contour memory KSP2, which otherwise is substantially of the same design, may be dimensioned smaller than the memory KSP1. All memory lines of the contour memory KSP1 whose addresses are greater than $(k+2)$ may be shifted down two lines. As a result, the number of the lines occupied in the contour memory KSP1 is at all times equal to the number of contours in the column just scanned. Following restoration of the feature sets of contours still operative, the condition for a contour termination must be questioned again on the basis of the unbalanced equation (2) in order to possibly identify several directly superposed contour pairs of a column. If it is then revealed that neither of the two unbalanced equations (1) or (2) is met for an image signal change just scanned, the condition represents the criterion for the continuation of a marked contour. The elementary features disclosed from the differential value of the contour ordinates are then coded and entered in the feature memory SM.

Figure 8:
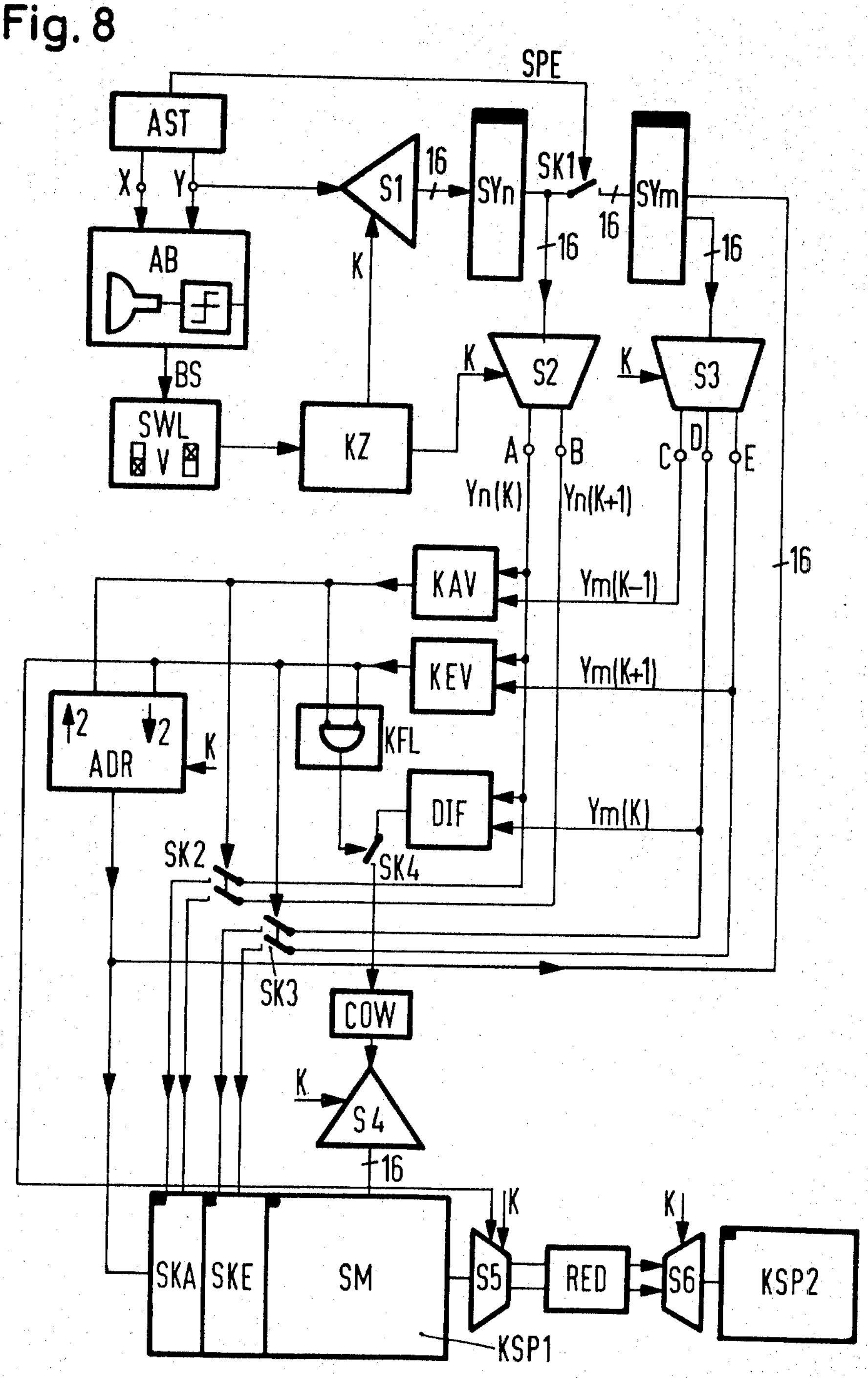
FIG. 8 is a circuit diagram illustration of an apparatus for the determination and intermediate storage of a written symbol according to the principles of the present invention.

Based on the circuit diagram of an installation in accordance with an embodiment of the present invention illustrated in FIG. 8, the features of the invention so far described individually will now be summarized once again.

FIG. 8 illustrates four memory elements. It shows as an operating memory, a first contour memory KSP1 with the memory unit SKA to store the contour starts, the memory unit SKE to store the contour terminations and the feature memory SM for storing the elementary features of a contour. To this is added as a result memory the second contour memory KSP2, which, like the memory KSP1 is assumed to have 16 lines, but the word to be stored in one memory cell is assumed to have only half the size of a word to be stored in the memory KSP1.

In addition, one memory column SY$m$ is provided for the contour ordinates of the scanning column last scanned $m$, having $16 \times 6$ bits, which is line-coupled with the contour memory KSP1. Finally, an additional memory column SY$n$ for the contour ordinates of the current scanning column $n$ is provided and has $16 \times 6$ bits which corresponds to the first memory column SY$m$ as a fourth memory element. Two consecutive image signals determine whether there is a black-white transfer or a white-black transfer during scanning. This criterion is determined in the black-white-logic circuit SWL. Each such image signal change is counted in the contour marker KZ so that the ordinal number of the contour address $k$ is determined and individual multiple switches S1 – S6 are controlled accordingly. With an image signal change, the contour ordinate is transmitted from a scanning control AST by way of a first multiple switch S1 to one of the 16 memory locations of the second memory column SY$n$. In case of a column termination indicated by the scanning control AST through an order SPE, the contacts of a separation switch SK1 are switched through and the first memory column SY$m$ receives the entire memory content of the memory column SY$n$, while at the same time the contour market KZ is reset to $k=0$.

With each image signal change corresponding to a black-white transfer or to a white-black transfer, two and/or three of the inputs of the two memory columns SY$n$ and SY$m$ are switched by the multiple switches S2 and S3 to the outputs of the two multiple switches S2 and/or S3 so that the values Y$n$ $(k)$, y$n$ $(k+1)$ and/or Y$m$ $(k)$, Y$m$ $(k-1)$, Y$m$ $(k+1)$ are transmitted to two comparison circuits KAV and KEV, in which the two unbalanced equations (1) and (2) are realized logically and with which the conditions for the beginning of a contour and/or the termination of a contour are therefore determined. If the first comparison circuit KAV shows the unbalanced equation (1) to be met, the values Y$n$ $(k-1)$ and Y$n$ $(k)$ and the volumn position $x$ are transmitted as coordinates of both contour starts into the first contour memory KSP1, while previously a shifting of the characteristic sets of major addresses took place by two contour memory lines each upwardly in response to operation of the contour market KZ. A control unit ADR contains a shifting unit, a characteristic counter and an address selector for approaching the contour memory KSP1.

In response to a contour termination signal, Y$m$ $(k+1)$ and Y$m$ $(k)$ and $x$ are transmitted as the coordinates of the contour termination into the contour memory KSP1. The contents of the corresponding contour memory lines may be transmitted after one feature reduction in a feature reducer (RED) into the second contour memory KSP2. For selecting the corresponding memory lines of the contour memories KSP1 and KSP2, the multiple switches S5 and/or S6, controlled by the contour market KZ are employed. The feature sets of major addresses can now be shifted by two lines downwardly. This again is accomplished by the address control ADR of the contour memory KSP1. If on the other hand neither a start nor a termination of a contour is detected by the comparison circuits KAV and KEV, the marked contour is considered as continuing and the ordinate difference $Yn(k) - Ym(k)$ is determined in a difference circuit DIF. With a logic circuit KFL connected to the outputs of both comparison circuits KAV and KEV, it is determined that neither unbalanced equation is met, a separation switch SK4 is closed and the differential circuit DIF is connected to the input of a code converter COW. In the code converter COW, the elements are determined from the determined difference value of the contour ordinates and are then transferred into the $k^{th}$ line of the feature memory SM according to the setting of the multiple switch S4 which also operates as a function of the contour market SZ.

While certain features of the instant invention were discussed above in detail with respect to a preferred embodiment, many other solutions may be obtained within the scope of the invention. For example, if several contour starts or contour terminations follow one another closely in time, it is possible that the time made available by the scanning program may no longer suffice to complete the mathematical operations. Here, an uncoupling in time by means of a buffer memory column $SYn$ would offer the advantage of distributing the mathematical operations at will over the column scanning time. Moreover, it is easily determinable to design a method according to the invention with only one contour memory when completed contours remain in the contour memory; however, then the address of a comparison contour generally is no longer adjacent the current contour address, but must be determined in consideration of an identification which could take place for example on the basis of the contour terminations.

Many other changes and modifications may be made by those skilled in the art without departing from the spirit and scope of our invention and it is to be understood that we intend to include within the patent warranted hereon all such changes and modifications as may reasonably and properly be included within the scope of our contribution to the art.

What we claim is:

1. A method for determining and storing digital information representing a written symbol which consists of several contours which have been scanned columnwise by a scanner which produces digital image signals, comprising the steps of: detecting changes of the digital image signals from one phase to the other for each column scanned; counting consecutively the phase changes; assigning a contour memory address for each contour in accordance with the counted phase changes; quantitatively determining the difference values of the ordinates of a contour occurring in two consecutive scanned columns; storing the quantitative difference in a contour memory, and determining the start of a pair of new contours in the scanning process in accordance with the expression $$Yn(k) \leq Ym(k-1)+C$$

and the end of a pair of contours in the scanning process by the expression $$Yn(k) > ym(k+1)+C$$

where $Yn$ and $Ym$ are ordinate values, $k$, $(k-1)$ and $(k+1)$ identify adjacent scanned columns and $C$ is a functional variable.

2. The method of claim 1, wherein the step of determining the start and end of pairs of new contours is further defined as assigning a binary 1 to the symbol and a binary 0 to the symbol background, determining the function variable $C$ as equal to −2 in the $n^{th}$ column at the start of a new inner contour and at the end of an outer contour where there is a phase change from a 1 to a 0, and determining the function variable $C$ as equal to +1 in the $n^{th}$ column at the start of a new outer contour and at the end of an inner contour, whereby the unbalanced equations are met.

3. The method of claim 1, comprising the provision of upper and lower reference contours for the scanned symbol as permanent comparative contours.

4. The method of claim 1, comprising the steps of describing each contour by its elementary characteristics including "ascent positive" (SP) for an ascending contour course, "ascent negative" (SN) for a descending contour course, "horizontal" (HO) for a horizontal course, and "vertical" (VE) for a vertical course and digitizing the characteristics with combinations of the binary numbers 1 and 0.

5. The method of claim 4, comprising the step of determining from the ordinal differences the elementary characteristics of the symbol wherein a positive ordinate difference of an amount d between adjacent scanned columns corresponds to the elementary characteristic "ascent positive"(SP) and to a $(d-1)$ sequence of the elementary characteristic "vertical" (VE), a negative ordinate difference of an amount $d$ between adjacent scanned columns corresponds to the elementary characteristic "ascent negative" (SN) and to a $(d-1)$ sequence of the elementary characteristic "vertical" (VE), and an ordinal difference of zero corresponds to the elementary characteristic "horizontal" (HO).

6. The method of claim 1, comprising the step of directly addressing the contour memory with an address $k$ of a contour $k^{th}$ line; transferring the data content of all memory lines having an address greater than $(k-2)$ into respective lines having address greater by two in response to the determination of new contours at addresses $(k-1)$ and $k$; transferring the data content of the concluded pair of lines corresponding to an end of a contour pair to a second contour memory; and transferring, after the last-named transfer, the data content of the first-mentioned contour memory having addresses higher than the concluded pair of lines to respective addresses which are smaller by two than that of the concluded pair.

7. Apparatus for determining and storing digital information representing a written symbol which consists of several contours which are scanned column-wise by a scanner which produces digital image signals including a first binary phase representing the symbol and a secondary binary signal representing the symbol background, comprising: first and second memory units for storing in sequence digital image signals representing ordinates for respective consecutively scanned columns; third and fourth memory units for storing data relating to starts and ends of contour pairs; first and second switch means respectively interposed between said first and third and said second and fourth memory units for transferring digital information therebetween; first and second comparator circuits connected to respective ones of said first and second switch means for comparing the data of adjacent columns; third and fourth switch means interposed between said first and second switch means and said third and fourth memory units respectively and respectively connected to and controlled by said first and second comparator circuits for separating the information; a difference circuit connected to said first and second switch means for deriving the difference values between contour ordinates of adjacent columns; a fifth memory unit for storing elemental characteristics of a symbol a fifth switch means connected between said difference circuit and said fifth memory unit and connected to and controlled by said first and second comparator circuits to transfer the data to said fifth memory unit; and a code converter interposed between said fifth switch means and said fifth memory unit for converting the difference values of the contour ordinates into coded form representing the elemental characteristics of the scanned symbol.

* * * * *

UNITED STATES PATENT OFFICE

CERTIFICATE OF CORRECTION

Patent No. 3,713,098 Issued Dated January 23, 1973

Inventor(s) Meinolf Muenchhausen, et al

It is certified that error appears in the above-identified patent and that said Letters Patent are hereby corrected as shown below:

ABSTRACT, line 22, should read --Yn(k) > Ym(k+1) + C--;

Column 3, line 5, should read --Yn(k) > Ym(k+1) + C--;

Column 6, line 46, should read --Yn(k) = Ym(k+1) - 1--;

Column 8, line 42, "yn (k+1)" should read --Yn (k+1)--; and

Column 10, line 4, should read --Yn(k) > Ym(k+1) + C--.

Signed and sealed this 27th day of August 1974.

(SEAL)
Attest:

McCOY M. GIBSON, JR.
Attesting Officer

C. MARSHALL DANN
Commissioner of Patents